(12) United States Patent
Kye et al.

(10) Patent No.: US 11,539,775 B2
(45) Date of Patent: Dec. 27, 2022

(54) METHOD FOR CONTROLLING VIDEO CALL AND ELECTRONIC DEVICE THEREOF

(71) Applicant: Samsung Electronics Co., Ltd., Suwon-si (KR)

(72) Inventors: Jaemin Kye, Suwon-si (KR); Jeongseop Park, Suwon-si (KR); Junhong Park, Suwon-si (KR); Soyeon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/213,029

(22) Filed: Mar. 25, 2021

(65) Prior Publication Data

US 2021/0306396 A1    Sep. 30, 2021

(30) Foreign Application Priority Data

Mar. 25, 2020    (KR) .................. 10-2020-0035984

(51) Int. Cl.
*H04L 65/756* (2022.01)
*H04L 65/75* (2022.01)
(Continued)

(52) U.S. Cl.
CPC .......... *H04L 65/75* (2022.05); *G06F 1/1616* (2013.01); *H04L 65/1069* (2013.01); *H04L 65/1104* (2022.05); *H04L 65/756* (2022.05)

(58) Field of Classification Search
CPC ............. H04L 65/601; H04L 65/1006; H04L 65/1069; H04L 69/24; G06F 1/1616;
(Continued)

(56) References Cited

U.S. PATENT DOCUMENTS

| | | |
|---|---|---|
| 8,493,428 B2 | 7/2013 | Choi |
| 8,803,816 B2 | 8/2014 | Kilpatrick, II et al. |

(Continued)

FOREIGN PATENT DOCUMENTS

| | | |
|---|---|---|
| CN | 107483996 A | 12/2017 |
| KR | 10-2009-0029454 A | 3/2009 |

(Continued)

OTHER PUBLICATIONS

International Search Report and Written Opinion of the International Searching Authority in connection with International Application No. PCT/KR2021/003643 dated Jul. 26, 2021, 6 pages.

*Primary Examiner* — Glenford J Madamba

(57) ABSTRACT

An electronic device includes at least one display, a communication circuit, at least one processor, and a memory. The processor is configured to obtain information on a first display aspect ratio associated with a current state of the at least one display if an input indicating initiation of a video call is received. The processor is configured to determine at least one first image ratio associated with the video call based on the information on the first display aspect ratio. The processor is configured to transmit, to an external electronic device, a first signal including information on the at least one first image ratio. The processor is configured to receive, from the external electronic device, a second signal including information on a second image ratio associated with the video call. The processor is configured to perform the video call based on the second image ratio.

18 Claims, 14 Drawing Sheets

(51) Int. Cl.
*H04L 65/1069* (2022.01)
*G06F 1/16* (2006.01)
*H04L 65/1104* (2022.01)

(58) Field of Classification Search
CPC ...... G06F 3/1462; H04N 7/0122; H04N 5/45; H04W 28/18
USPC .......................................................... 709/228
See application file for complete search history.

(56) References Cited

U.S. PATENT DOCUMENTS

| | | | |
|---|---|---|---|
| 8,836,611 B2 | 9/2014 | Kilpatrick, II et al. | |
| 8,866,840 B2 | 10/2014 | Dahl et al. | |
| 8,947,320 B2 | 2/2015 | King et al. | |
| 9,009,984 B2 | 4/2015 | Caskey et al. | |
| 9,013,534 B2 | 4/2015 | Choi | |
| 9,204,090 B2 | 12/2015 | Kim et al. | |
| 9,215,405 B2 | 12/2015 | Atkinson | |
| 9,307,194 B2 | 4/2016 | Kim et al. | |
| 9,344,676 B2 | 5/2016 | Choi | |
| 9,357,140 B2 | 5/2016 | Atkinson | |
| 9,479,967 B1 * | 10/2016 | Smith | H04L 65/1069 |
| 9,491,403 B2 | 11/2016 | Atkinson | |
| 9,716,857 B2 | 7/2017 | Atkinson | |
| 10,075,673 B2 | 9/2018 | Kim et al. | |
| 10,687,018 B1 * | 6/2020 | Jeong | H04N 21/2343 |
| 10,949,654 B2 | 3/2021 | Ahn et al. | |
| 2011/0216064 A1 | 9/2011 | Dahl et al. | |
| 2014/0022329 A1 | 1/2014 | Kim et al. | |
| 2015/0070458 A1 | 3/2015 | Kim et al. | |
| 2016/0065893 A1 | 3/2016 | Kim et al. | |
| 2016/0249015 A1 | 8/2016 | Atkinson | |
| 2017/0223311 A1 | 8/2017 | Kim et al. | |
| 2019/0188459 A1 | 6/2019 | Ahn et al. | |
| 2019/0261519 A1 | 8/2019 | Park et al. | |

FOREIGN PATENT DOCUMENTS

| | | |
|---|---|---|
| KR | 10-2010-0057709 A | 6/2010 |
| KR | 10-2013-0081800 A | 7/2013 |
| WO | 2014014238 A1 | 1/2014 |

\* cited by examiner

METHOD FOR CONTROLLING VIDEO CALL AND ELECTRONIC DEVICE THEREOF

CROSS-REFERENCE TO RELATED APPLICATION

This application is based on and claims priority under 35 U.S.C. § 119(a) to Korean Patent Application No. 10-2020-0035984 filed on Mar. 25, 2020 in the Korean Intellectual Property Office, the disclosure of which is incorporated by reference herein in its entirety.

BACKGROUND

1. Field

The present disclosure relates to a method for controlling a video call and an electronic device thereof.

2. Description of Related Art

Calls over packet-switched (PS) networks are being used. For example, voice over Internet protocol (VoIP) technology based on Internet protocol (IP) may be used. In VoIP technology, audio and/or video may be exchanged through data packets. VoIP technology may be applied to various network platforms based on packet data networks.

To perform a video call, an electronic device may negotiate a video codec and an audio codec to be used for the video call with an external electronic device. For example, the electronic device may negotiate a video codec and an audio codec to be used for a video call by transmitting information on the video codec and audio codec supported by the electronic device to the external electronic device and receiving a response message from the external electronic device. The electronic device may perform the video call with the external electronic device by using the negotiated video codec and audio codec. The electronic device may perform the video call with the video codec and audio codec negotiated with the external electronic device. For example, negotiation of the video codec may include negotiation of an aspect ratio of an image used for the video call.

Various form factors for portable electronic devices have been presented. In the related art, most portable electronic devices have a bar shape to match the shape of a display. However, various electronic devices that may be changed in various shapes have been presented. For example, the portable electronic device may be a foldable electronic device. The shape of the display of the portable electronic device may be changed with the change in the shape of the portable electronic device.

Despite the change possibility of the shape of the portable electronic device, the electronic device may perform a video call depending on the negotiated image aspect ratio. In this case, the electronic device may perform a video call by using an image having an aspect ratio that does not match the aspect ratio of the display. In order to match the image to the display, the electronic device may remove a part of the received image or reduce the received image to display it on the display.

SUMMARY

According to an aspect of the present disclosure, there is provided a foldable electronic device including: at least one display; a communication circuit; at least one processor operatively connected to the at least one display and the communication circuit; and a memory operatively connected with the at least one processor, in which the memory stores instructions that, when executed, cause the at least one processor to: obtain information on a first display aspect ratio associated with a current state of the at least one display if an input indicating initiation of a video call is received; determine at least one first image ratio associated with the video call based on the information on the first display aspect ratio; transmit, to an external electronic device, a first signal including information on the at least one first image ratio by using the communication circuit; receive, from the external electronic device, a second signal including information on a second image ratio associated with the video call by using the communication circuit; and perform the video call by using the communication circuit based on the second image ratio.

According to another aspect of the present disclosure, there is provided a method for performing a video call by a foldable electronic device, the method including: receiving an input indicating initiation of a video call; obtaining information on a first display aspect ratio associated with a current state of at least one display of the foldable electronic device; determining at least one first image ratio associated with the video call based on the information on the first display aspect ratio; transmitting, to an external electronic device, a first signal including information on the at least one first image ratio; receiving, from the external electronic device, a second signal including information on a second image ratio associated with the video call; and performing the video call based on the second image ratio.

According to various embodiments of the present disclosure, the electronic device may support a video call based on an aspect ratio of a display.

The electronic device may change the aspect ratio of an image used in the video call in response to a change in the shape of the display.

Besides, various effects may be provided that are directly or indirectly identified through the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With respect to the description of the drawings, the same or similar reference signs may be used for the same or similar elements.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments disclosed in the present disclosure will be described with reference to the accompanying drawings. It should be appreciated that embodiments and the terms used therein are not intended to limit the technologies set forth herein to particular embodiments and include various changes, equivalents, and/or replacements for a corresponding embodiment.

Figure 1:
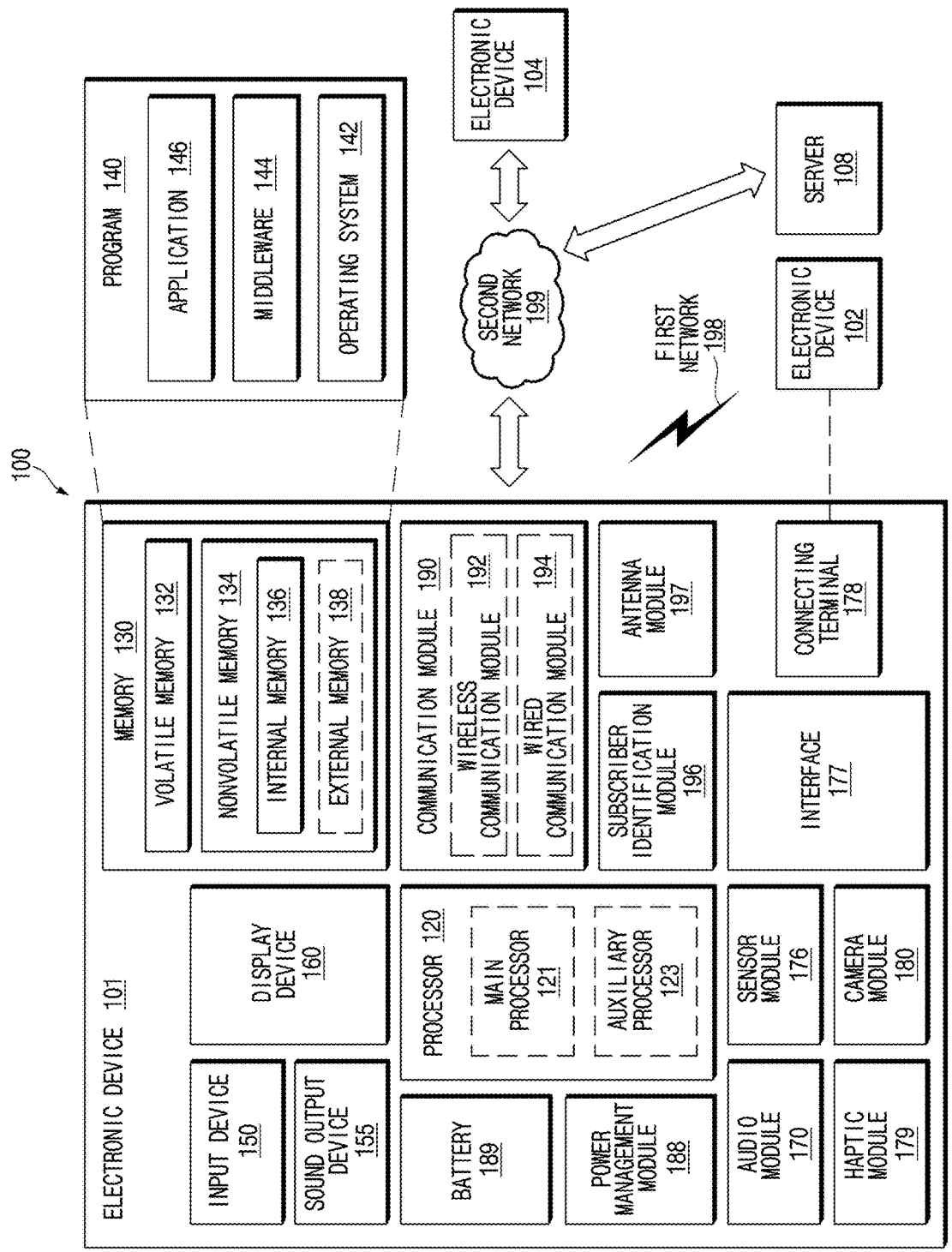
FIG. 1 illustrates a block diagram of an electronic device in a network according to various embodiments of this disclosure.

FIG. 1 is a block diagram illustrating an electronic device 101 in a network environment 100 according to various embodiments of this disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
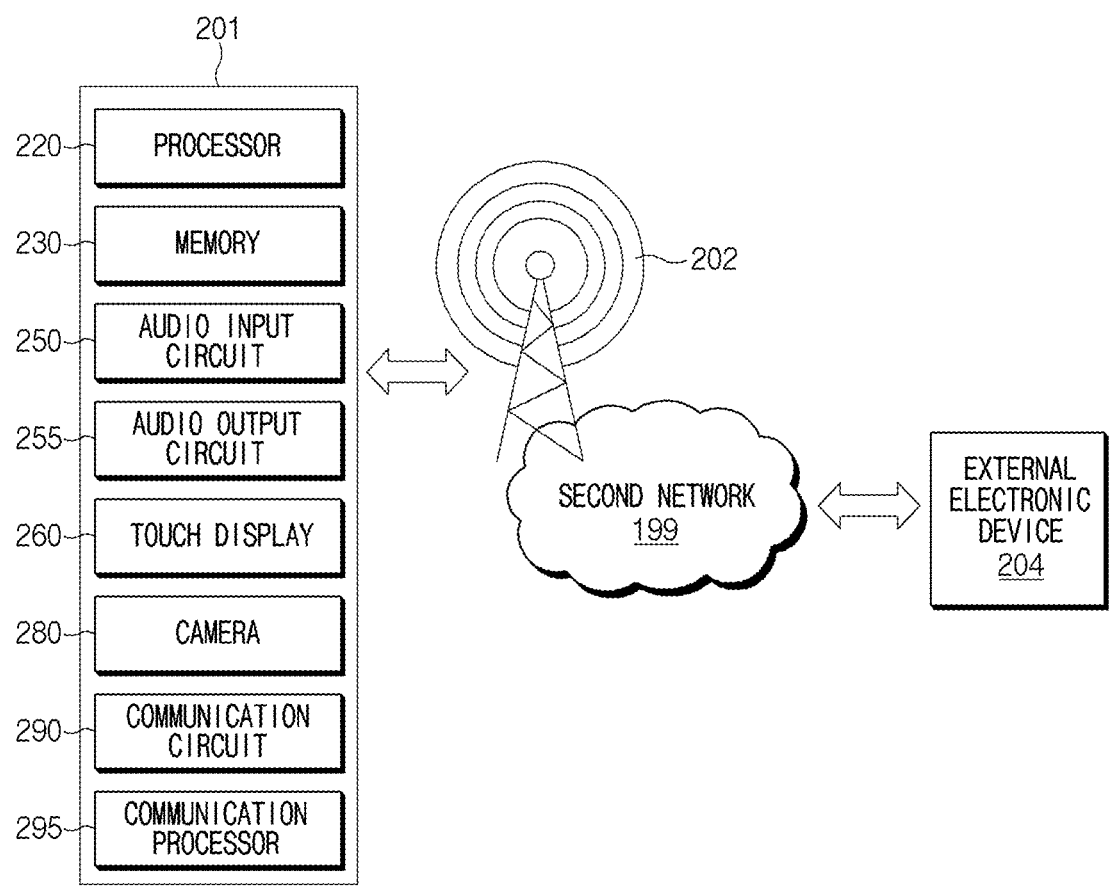
FIG. 2 illustrates a communication environment of an electronic device with an external electronic device, according to an embodiment of this disclosure.

FIG. 2 illustrates a communication environment of an electronic device 201 with an external electronic device 204, according to an embodiment of this disclosure.

According to an embodiment, an electronic device 201 (e.g., the electronic device 101 of FIG. 1) may include a processor 220 (e.g., the processor 120 of FIG. 1 (e.g., an application processor)), a memory 230 (e.g., the memory 130 of FIG. 1), an audio input circuit 250 (e.g., the input module 150 of FIG. 1), an audio output circuit module (e.g., the sound output module 155 of FIG. 1), a touch display 260 (e.g., the display module 160 of FIG. 1), a sensor circuit 270 (e.g., the sensor module 176 of FIG. 1), a camera 280 (e.g., the camera module 180 of FIG. 1), and a communication circuit 290 (e.g., the communication module 190 of FIG. 1 and/or the communication processor 295 (e.g., the auxiliary processor 123 of FIG. 1)). The configurations of the electronic device 201 illustrated in FIG. 2 are exemplary, and embodiments of the present disclosure are not limited thereto. For example, the electronic device 201 may not include at least one of the components illustrated in FIG. 2. For another example, the electronic device 201 may further include a component not illustrated in FIG. 2.

The processor 220 may be operatively connected to the memory 230, the audio input circuit 250, the audio output circuit 255, the touch display 260, the sensor circuit 270, the camera 280, the communication circuit 290 and/or the communication processor 295. The processor 220 may control components of the electronic device 201. For example, the processor 220 may control the components of the electronic device 201 according to one or more instructions stored in the memory 230. According to an embodiment, the processor 220 may include an application processor. In FIG. 2, the processor 220 and the communication processor 295 are illustrated as separate configurations; however, according to an embodiment, the processor 220 and the communication processor 295 may be implemented as a single chip.

The audio input circuit 250 may receive an audio signal. For example, the audio input circuit 250 may include at least one microphone or be connected to at least one microphone in order to receive an audio signal. The audio input circuit 250 may convert the received analog audio signal into a digital signal. For example, the audio input circuit 250 may include an analog-to-digital converter (ADC).

The audio output circuit 255 may output the audio signal. For example, the audio output circuit 255 may include at least one transducer (e.g., a speaker) for outputting the audio signal. The audio output circuit 255 may include a digital-to-analog converter (DAC) for converting a digital signal into an analog signal.

The touch display 260 may display an image and receive a touch input. For example, the touch display 260 may include a plurality of pixels that emit light. The processor 220 may display an image by using at least some pixels of the touch display 260. The touch display 260 may include a touch sensing layer for sensing a touch input. The touch display 260 may transfer information on the obtained touch input to the processor 220. The touch display 260 may include a plurality of displays, and at least one of the plurality of displays may be a foldable display.

The sensor circuit 270 may obtain state information associated with a folded state or an unfolded state of the electronic device 201. For example, the sensor circuit 270 may include a hinge sensor capable of detecting a folding angle of the electronic device 201. The sensor circuit 270 may include a plurality of acceleration sensors and/or gyro sensors disposed in different regions around the folding axis of the electronic device 201. The sensor circuit 270 may include any sensor (e.g., a magnetic sensor) capable of detecting a folding or unfolded state of the electronic device 201. The processor 220 may determine the folded state or the unfolded state of the electronic device 201 by using the sensor circuit 270. The processor 220 may obtain the folding angle of the housing of the electronic device 201 by using the sensor circuit 270, and determine state information associated with the folded state or the unfolded state of the electronic device 201 based on the folding angle. According to an embodiment, the processor 220 may identify (e.g., determine) a display mode of the electronic device 201 based on the folded state, the unfolded state, or the associated state.

The camera 280 may acquire an image. For example, the camera 280 may include an image sensor for acquiring an image. The processor 220 may acquire an image of an external object by using the camera 280. For example, the processor 220 may acquire a still image and/or a moving picture by using the camera 280. In an example, the electronic device 201 may include a plurality of cameras.

The communication circuit 290 may provide the electronic device 201 with communication with the external electronic device 204 through at least one network. For example, the communication circuit 290 may be configured to communicate with the external electronic device 204 through a base station 202 and a second network 199 (e.g., a cellular network). In FIG. 2, the communication circuit 290 is illustrated as providing communication through the second network 199; however, embodiments of the present disclosure are not limited thereto. For example, the communication circuit 290 may be configured to communicate with the external electronic device 204 through an Internet network connected to a short-range wireless network (e.g., a WiFi network).

The communication processor 295 may be operatively connected to the communication circuit 290 and may communicate with the external electronic device 204 by using the communication circuit 290. The communication processor 295 may be operatively connected to the processor 220. For example, the electronic device 201 may include an interface for exchanging information between the communication processor 295 and the processor 220.

The electronic device 201 may be a portable communication device configured to perform a call. According to an embodiment, the electronic device 201 may be configured to perform a call based on packet data. For example, the electronic device 201 may be configured to perform a video call and/or a voice call based on packet data. According to an embodiment, the electronic device 201 may be configured to perform a packet based call through a cellular network. For example, the electronic device 201 may be configured to perform a video call based on voice over long-term evolution (VoLTE). For another example, the electronic device 201 may be configured to perform a video call based on voice over WiFi (VoWiFi). According to an embodiment, the electronic device 201 may perform a call by using an application for performing a call that is stored in the memory 230. For example, the application may include a call application and/or a mission critical push-to-talk (MCPTT) application. The electronic device 201 may perform a packet-based video call by using various modules.

The processor 220 may transmit, to the external electronic device 204, audio data obtained by the audio input circuit 250 and video data obtained by the camera 280 while performing the video call. For example, the processor 220 may encode audio data by using a designated audio codec and encode video data by using a designated video codec. The processor 220 may transmit the encoded audio data and the encoded video data to the external electronic device 204 by using the communication circuit 290. For example, the processor 220 may transmit a data packet including the encoded audio data and the encoded video data to the external electronic device 204 by using the communication processor 295, based on a real-time transport protocol (RTP).

The processor 220 may receive a data packet including audio data and video data from the external electronic device 204 while performing a video call. For example, the processor 220 may receive a data packet from the external electronic device 204 by using the communication processor 295 and/or the communication circuit 290. The processor 220 may decode the received audio data by using an audio codec, and may decode the video data by using a video codec. The processor 220 may output the decoded audio data by using the audio output circuit 255. The processor 220 may output the decoded video data by using the touch display 260.

The shape of the touch display 260 may be changed. For example, the touch display 260 may include a plurality of displays, and the shape of the display may be changed according to the change of the display to be used among the displays. For another example, the touch display 260 may be a display of which a physical shape is changeable (e.g., a foldable, rollable, and/or stretchable display). Hereinafter, various examples of the electronic device 201 may be described with reference to FIGS. 3 and 4.

A foldable electronic device (e.g., the electronic device 201) according to an embodiment may include at least one display (e.g., the touch display 260), a communication circuit (e.g., the communication circuit 290), at least one processor (e.g., the processor 220 of FIG. 2 and/or the communication processor 295) operatively connected to the at least one display and the communication circuit, and a memory (the memory 230) operatively connected with the at least one processor. The memory may store one or more instructions that, when executed, cause the at least one processor to perform operations to be described below.

The at least one processor may be configured to obtain information on a first display aspect ratio associated with a current state of the at least one display if an input indicating initiation of a video call is received, determine at least one first image ratio associated with the video call based on the information on the first display aspect ratio, transmit, to an external electronic device, a first signal including information on the at least one first image ratio by using the communication circuit, receive, from the external electronic device, a second signal including information on a second image ratio associated with the video call by using the communication circuit, and perform the video call by using the communication circuit based on the second image ratio. For example, the first signal may include a session initiation protocol (SIP) INVITE message.

When executed, the instructions may cause the at least one processor to receive video data from the external electronic device by using the communication circuit, and display the video data on the at least one display at the second image ratio.

The foldable electronic device may further include a sensor circuit configured to detect folding or unfolding of the foldable electronic device. When executed, the instructions may cause the processor to detect the folding or unfolding of the foldable electronic device by using the sensor circuit while performing the video call, and renegotiate an image ratio associated with the video call with the external electronic device based on a second display aspect ratio of the at least one display changed with the folding or unfolding of the foldable electronic device.

When executed, the instructions may cause the processor to renegotiate the image ratio associated with the video call by transmitting, to the external electronic device, a session initiation protocol (SIP) RE-INVITE message including a third image ratio corresponding to the second display aspect ratio by using the communication circuit. The sensor circuit may include at least one of at least one acceleration sensor, at least one gyro sensor, or at least one hinge sensor.

In the at least one display, a display to be used for the video call may be changed or a display region to be used for the video call may be changed, with the folding or unfolding of the foldable electronic device.

When executed, the instructions may cause the processor to output, to the at least one display, an image corresponding to the video call at the second image ratio if the second image ratio is the same as the first image ratio.

When executed, the instructions may cause the processor to provide guide information indicating the folding or unfolding of the foldable electronic device if the second image ratio is different from the first image ratio. For example, the information on the at least one first image ratio may include a video codec list including information on a plurality of video codecs supported by the foldable electronic device. A video codec corresponding to the first display aspect ratio may be set to have the highest priority in the video codec list.

Figure 3:
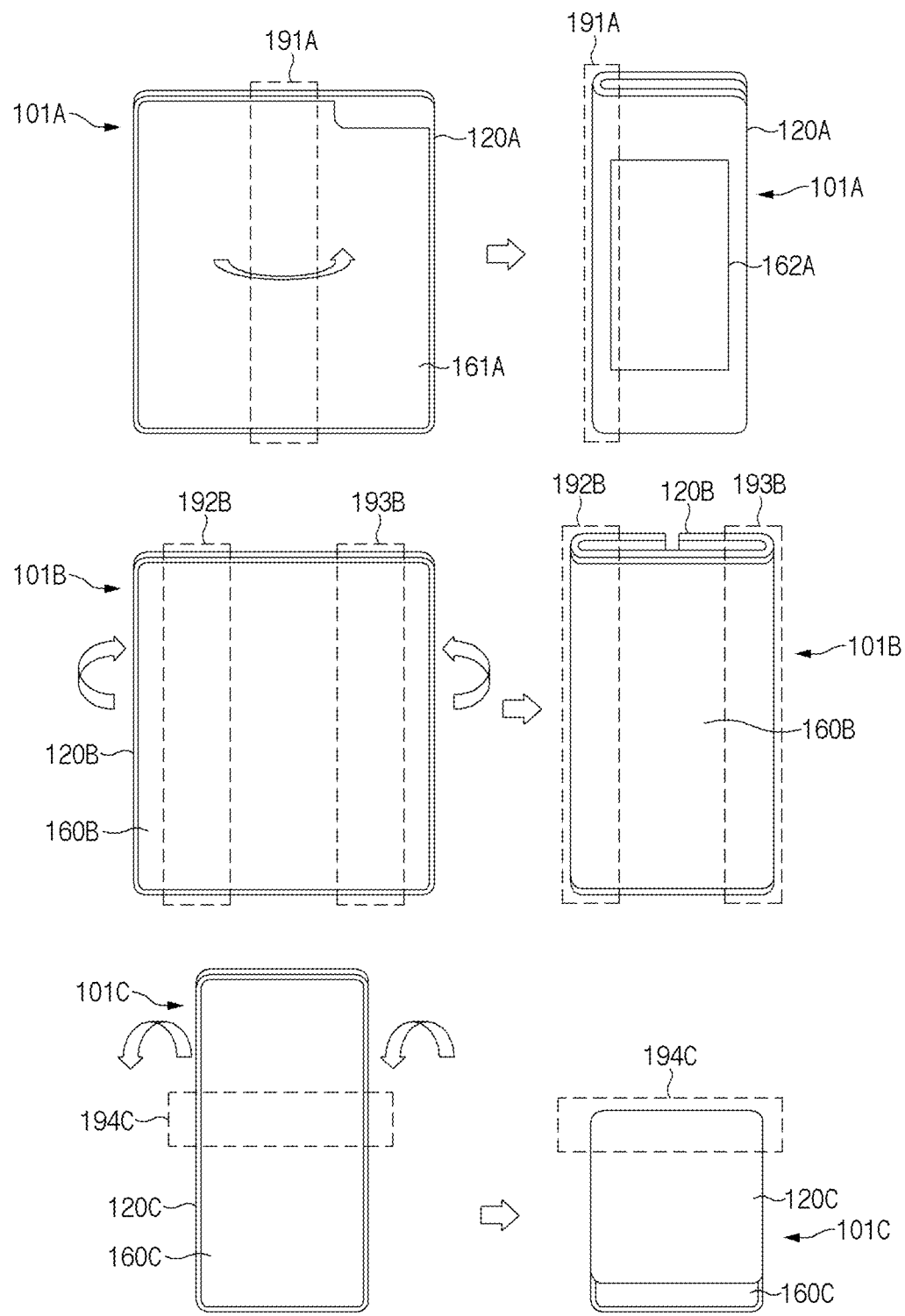
FIG. 3 illustrates electronic devices of which a shape changes, according to an embodiment of this disclosure.

FIG. 3 illustrates electronic devices of which a shape changes, according to an embodiment of this disclosure.

The shape of the electronic device 201 may be physically changed with folding/unfolding. For example, the electronic device may include a housing and a display that have flexibility in at least some portions. Around the flexible portion of the electronic device 201, the electronic device 201 may be folded (e.g., open) or unfolded (e.g., closed). For example, a portion of the electronic device 201 having flexibility may be referred to as a folded portion. The folded portion refers to a portion (e.g., a hinge) or a region in which the shape of the electronic device 201 is to be changed, and is not limited to a specific structure.

According to an embodiment, a first electronic device 101A (e.g., the electronic device 201 of FIG. 2) may be folded left and right. For example, the first electronic device 101A may be folded around at least a folded portion 191A. For example, the first electronic device 101A may include a first display 161A (e.g., the touch display 260 of FIG. 2) and a housing 120A, which have flexibility at a portion corresponding to the folded portion 191A. The first electronic device 101A may be folded left and right around the folded portion 191A. The first electronic device 101A may include a second display 162A (e.g., the touch display 260 of FIG. 2) exposed to the outside in a folded state. In FIG. 3, the first electronic device 101A is illustrated as an in-fold electronic device in which the first display 161A is folded inward; however, embodiments of the present disclosure are not limited thereto. For example, the first electronic device 101A may be an out-foldable electronic device or an electronic device that supports both in-fold and out-fold. For another example, the first display 161A is illustrated as a single display; however, embodiments of the present disclosure are not limited thereto. The first electronic device 101A may include a plurality of displays divided around the folded portion 191A. The housing 120A may also include a plurality of housings divided around the folded portion 191A. For another example, the first electronic device 101A may be a combination of a plurality of electronic devices coupled to be folded around the folded portion 191A. In this case, a plurality of electronic devices may be coupled to each other by a separate structure (e.g., a housing and/or a hinge).

According to an embodiment, a second electronic device 101B (e.g., the electronic device 201 of FIG. 2) may be folded left and right around a plurality of axes. For example, the second electronic device 101B may include a display 160B (e.g., the touch display 260 of FIG. 2) and a housing 120B that have flexibility at least at portions corresponding to a second folded portion 192B and a third folded portion 193B. The second electronic device 101B may be folded left and right around the second folded portion 192B and the third folded portion 193B. In FIG. 3, the second electronic device 101B is illustrated as an out-foldable electronic device in which the display 160B is folded outward; however, embodiments of the present disclosure are not limited thereto. For example, the second electronic device 101B may be in-folded at the second folded portion 192B and/or the third folded portion 193B. For another example, the display 160B is illustrated as a single display; however, embodiments of the present disclosure are not limited thereto. The second electronic device 101B may include a plurality of displays divided based on at least one of the second folded portion 192B and the third folded portion 193B. The housing 120B may also include a plurality of housings divided based on at least one of the second folded portion 192B and the third folded portion 193B. For another example, the second electronic device 101B may be a combination of a plurality of electronic devices coupled to be folded around the second folded portion 192B and the third folded portion 193B. In this case, for example, a plurality of electronic devices may be coupled to each other by a separate structure (e.g., a housing and/or a hinge).

According to an embodiment, a third electronic device 101C (e.g., the electronic device 201 of FIG. 2) may be folded up and down. For example, the third electronic device 101C may include a display 160C (e.g., the touch display 260 of FIG. 2) and a housing 120C, which have flexibility at least at a portion corresponding to a fourth folded portion 194C. The third electronic device 101C may be folded up and down around the fourth folded portion 194C. In FIG. 3, the third electronic device 101C is illustrated as an in-fold electronic device in which the display 160C is folded inward; however, embodiments of the present disclosure are not limited thereto. For example, the third electronic device 101C may be out-folded, or in-folded and out-folded, at the fourth folded portion 194C. For another example, the display 160C is illustrated as a single display; however, embodiments of the present disclosure are not limited thereto. The third electronic device 101C may include a plurality of displays divided based on the fourth folded portion 194C. The housing 120C may also include a plurality of housings divided based on the folded portion 194C. For another example, the third electronic device 101C may be a combination of a plurality of electronic devices coupled to be folded around the folded portion 194C. In this case, a plurality of electronic devices may be coupled to each other by a separate structure (e.g., a housing and/or a hinge).

Changes in the physical shape of the electronic devices (e.g., 101A, 101B, and 101C) illustrated in FIG. 3 are exemplary, and embodiments of the present disclosure are not limited thereto. For example, the electronic device may be folded or unfolded around any axis.

Figure 4:
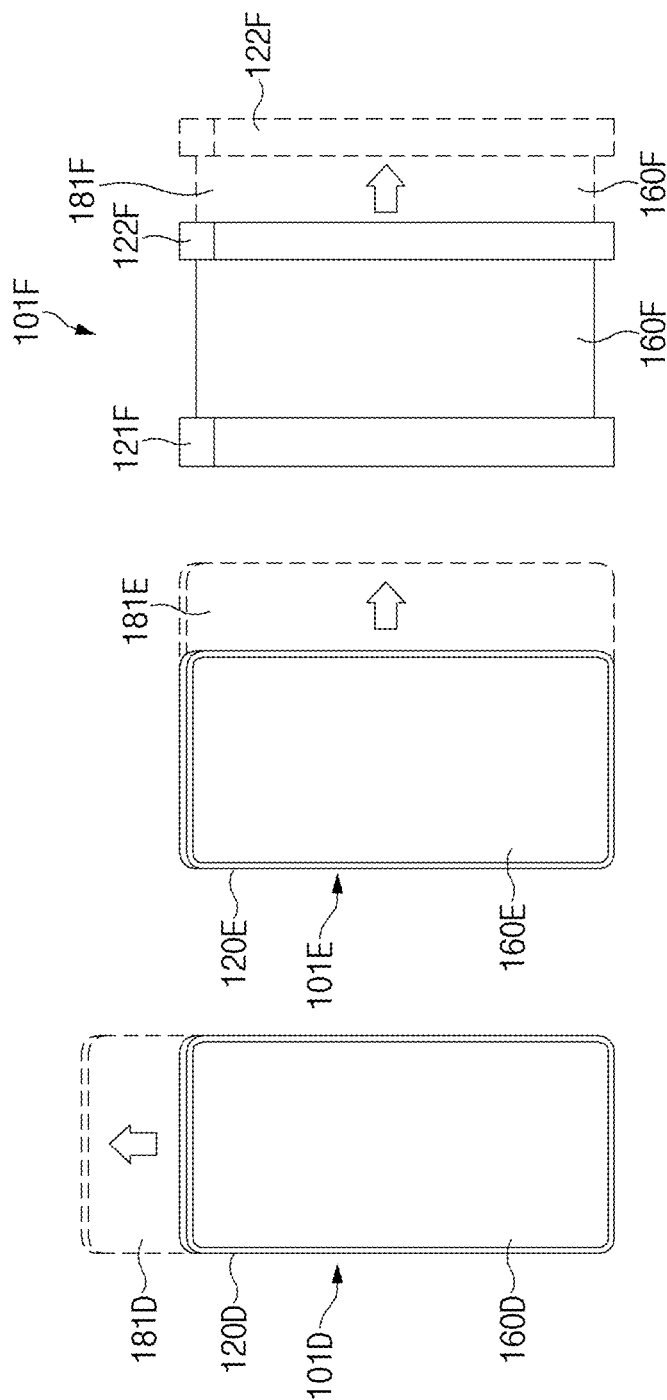
FIG. 4 illustrates electronic devices of which a shape changes, according to an embodiment of this disclosure.

FIG. 4 illustrates electronic devices of which a shape changes, according to an embodiment of this disclosure.

The shape of an electronic device (e.g., the electronic device 201 of FIG. 2) may be physically changed with extension/retraction of the housing of the electronic device. For example, the electronic device may include a housing and/or a display of which at least a portion is able to extend. For example, a portion of the electronic device may be slid or rolled so that the electronic device may be extended (e.g., open) or contracted (e.g., closed). When the shape of the electronic device is changed from a first shape to a second shape, an extension part refers to a portion or region corresponding to the difference between the first shape and the second shape, and is not limited to a specific structure.

A fourth electronic device 101D (e.g., the electronic device 201 of FIG. 2) may include an extension part 181D that extends/contracts up and down. For example, at least a portion of the housing 120D of the fourth electronic device 101D may include an extension part 181D that is able to extend upward of the fourth electronic device 101D. For example, the extension part 181D is a part of the housing 120D, and may extend the housing 120D of the fourth electronic device 101D by moving relatively upward with respect to the other part of the housing 120D. The extension part 181D may move independently from the display 160D (e.g., the touch display 260 of FIG. 2). For example, the extension part 181D may protrude relatively upward compared to the display 160D. For another example, the extension part 181D may protrude relatively downward compared to the display 160D. According to an embodiment, the extension part 181D may include a camera module. For example, the camera module may be configured to rotate with the movement of the extension part 181D.

A fifth electronic device 101E (e.g., the electronic device 201 of FIG. 2) may include an extension part 181E that extends/contracts left and right. For example, at least a portion of a housing 120E of the fifth electronic device 101E may include an extension part 181E that is able to extend in the right direction of the fifth electronic device 101E. For example, the extension part 181E may move independently from the display 160E (e.g., the touch display 260 of FIG. 2). In this case, a portion of the housing 120E may protrude beyond one side relative to the display 160E, thereby forming the extension part 181E. For another example, the extension part 181E may move together with the display 160E. In this case, a portion of the housing 120E and the display 160E may relatively protrude beyond one side, thereby forming the extension part 181E. According to an embodiment, the extension part 181E may include a camera module. For example, the camera module may be configured to rotate with the movement of the extension part 181E.

A sixth electronic device 101F (e.g., the electronic device 201 of FIG. 2) may include an extension part 181F that extends/contracts left and right. For example, a display 160F (e.g., the touch display 260 of FIG. 2) of the sixth electronic device 101F may be a rollable display. For example, the display 160F may be rolled and accommodated in a first housing 121F. For example, the display 160F may extend between the first housing 121F and a second housing 122F by being unrolled. The extension part 181F may be generated by unrolling of the display 160F.

Changes in the physical shape of the electronic devices (e.g., 101D, 101E, and 101F) illustrated in FIG. 4 are exemplary, and embodiments of the present disclosure are not limited thereto. For example, the electronic device may extend or contract in any direction.

With regard to the first electronic device 101A, the second electronic device 101B, the third electronic device 101C, the fourth electronic device 101D, the fifth electronic device 101E, or the sixth electronic device 101F of FIGS. 3 and 4, changes in the shape of various electronic devices have been described. The changes in shape are exemplary, and embodiments of the present disclosure are not limited thereto. Hereinafter, methods for controlling a video call corresponding to a change in the shape of an electronic device may be described.

Figure 5:
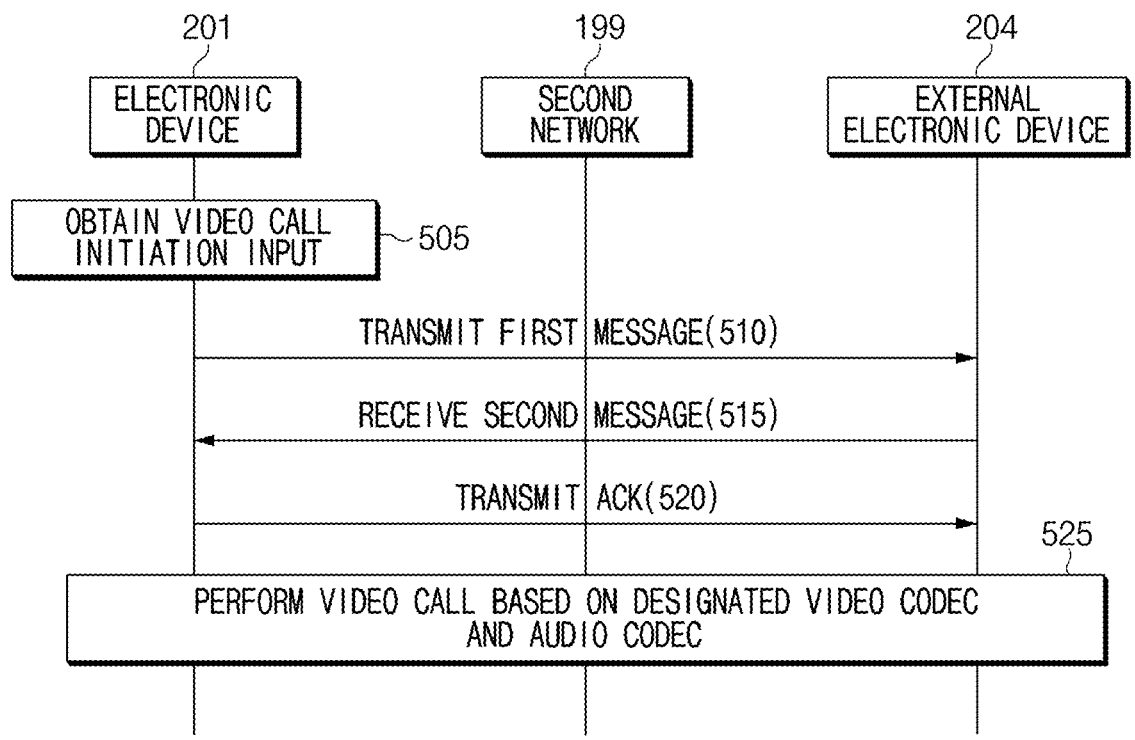
FIG. 5 illustrates a signal flow diagram of a method for performing a video call by an electronic device, according to an embodiment of this disclosure.

FIG. 5 illustrates a signal flow diagram 500 of a method for performing a video call by an electronic device according to an embodiment of this disclosure.

According to an embodiment, the electronic device 201 may obtain a video call initiation input in operation 505. For example, the electronic device 201 may receive a user input for a touch display (e.g., the touch display 260 of FIG. 2) as the video call initiation input. The electronic device 201 may provide an interface for initiating a video call with the execution of an application for performing a video call (e.g., a messenger application, a call application, or an MCPTT application), and may receive an input to the interface as the video call initiation input. For another example, the electronic device 201 may receive an input for executing an application for performing a video call as the video call initiation input. For example, in response to the video call initiation input, the electronic device 201 may perform operations 510, 515, and 520 according to a session initiation protocol (SIP) or a session description protocol (SDP).

In operation 510, the electronic device 201 may transmit the first message to the external electronic device 204 through the second network 199. For example, the first message may be an INVITE message. The first message may include information on at least one video codec and at least one audio codec that are supported for a video call of the electronic device 201. For example, the first message may include a list of video codecs supported by the electronic device 201. Information on video codecs in the video codec list may be sorted based on priority. The information on video codecs may include information on a codec type and clock rate for each video codec. For example, the first message may include a list of audio codecs supported by the electronic device 201. Information on audio codecs in the audio codec list may be sorted based on priority. The information on audio codecs may include information on a codec type, clock rate, and/or the number of channels for each audio codec.

In operation 515, the electronic device 201 may receive a second message from the external electronic device 204. For example, the second message may be a 200 OK message. The second message may include information on at least one video codec and at least one audio codec that are supported for a video call of the external electronic device 204. For example, the second message may include a list of video codecs supported by the external electronic device 204. Information on video codecs in the video codec list may be sorted based on priority. The information on video codecs may include information on a codec type and clock rate for each video codec. For example, the second message may include a list of audio codecs supported by the external electronic device 204. Information on audio codecs in the audio codec list may be sorted based on priority. The information on audio codecs may include information on a codec type, clock rate, and/or the number of channels for each audio codec.

Using the first message and the second message, the electronic device 201 and the external electronic device 204 may negotiate a video codec and an audio codec to be used for the video call. For example, the electronic device 201 may use, for the video call, a video codec and an audio codec having the highest priority among at least one video codec and at least one audio codec matched in the first message and the second message. Similarly, the external electronic device 204 may also determine a video codec and an audio codec to be used for the video call.

In operation 520, the electronic device 201 may transmit an acknowledgment (ACK) for the second message to the external electronic device 204. If negotiation of video and audio codecs to be used for the video call fails, the electronic device 201 may transmit a message for renegotiation to the external electronic device 204 or determine the failure of the video call.

If the negotiation of the video and audio codecs to be used for the video call is successful, in operation 525, the electronic device 201 may perform the video call with the external electronic device 204 based on a designated video (e.g., negotiated video codec) and a designated audio codec (e.g., negotiated audio codec). For example, according to an embodiment, the processor 220 may transmit, to the external electronic device 204, audio data obtained by the audio input circuit 250 and video data obtained by the camera 280 while performing the video call. For example, the electronic device 201 may encode audio data obtained by using an audio input circuit (e.g., the audio input circuit 250 of FIG. 2) by using a designated audio codec, and may encode video data obtained using a camera (e.g., the camera 280 of FIG. 2) by using a designated video codec. The electronic device 201 may transmit the encoded audio data and the encoded video data to the external electronic device 204. For example, the electronic device 201 may receive a data packet including audio data and video data from the external electronic device 204 while performing a video call. The electronic device 201 may decode the received audio data by using an audio codec, and may decode the video data by using a video codec. The electronic device 201 may output the decoded audio data by using an audio output circuit (e.g., the audio output circuit 255 of FIG. 2). The electronic device 201 may output the decoded video data by using a display (e.g., the touch display 260 of FIG. 2).

In the example of FIG. 5, the electronic device 201 is illustrated as communicating with the external electronic device 204 via the second network 199; however, embodiments of the present disclosure are not limited thereto. For example, the electronic device 201 may communicate with the external electronic device 204 by using a Wi-Fi network.

As described above with reference to FIG. 5, the electronic device 201 may negotiate a video codec and an audio codec for performing a video call with the external electronic device 204 based on a session initiation protocol. The electronic device 201 may transmit a list of video codecs that it supports through the first message. The information on the video codec included in the video codec list may include resolution information set for the corresponding video codec. For example, the resolution information may be parameter values (e.g., sprop-parameter-sets) set for the corresponding video codec. The parameter value may be encoded in a specified manner (e.g., base64). The external electronic device 204 may obtain resolution information set for the corresponding codec by decoding a corresponding value of the received first message. The external electronic device 204 may transmit, through the second message, information on a video codec having the highest priority among video codecs supported by the external electronic device 204 in the list of video codecs of the received first message. In this case, the external electronic device 204 may include parameter values (e.g., sprop-parameter-sets) for the corresponding video codec in the second message. Details on the negotiation of the video codec may be referred to by RFC6236, H.264, and RFC6184 technical specification.

In the negotiation of the video codec as illustrated in FIG. 5, in the related art, the electronic device 201 may be configured to transmit a first message including a list of preset video codecs. That is, the list of video codecs may be set by a manufacturer of the electronic device 201 or a mobile network operator (MNO). However, as described above with reference to FIGS. 3 and 4, if the shape of the electronic device 201 and the shape of the display may be changed, the resolution of the negotiated video codec may not match the resolution or aspect ratio of the display to be used for the current video call.

In the following description, the term "image ratio" or "aspect ratio" may include the term "resolution". In addition, the change in the shape of the display may include 1) a change in a shape by a change in a display to be used for a video call or 2) a change in a display region by a change in the shape of the display itself. For example, in the first electronic device 101A of FIG. 3, in the unfolded state, the first display 161A is used for a video call, but in the folded state, the second display 162A may be used for the video call. Due to differences in the shape of the first display 161A and the second display 162A, an aspect ratio (e.g., resolution) suitable for each of the first display 161A and the second display 162A may be different. In the unfolded state, the second electronic device 101B of FIG. 3 may perform a video call by using the display region corresponding to the entire display 160B, but in the folded state, may perform the video call by using the display region corresponding to a partial region of the display 160B. Due to the change of the display region, the aspect ratio suitable for the display 160B may be changed between the folded state and the unfolded state.

Figure 6:
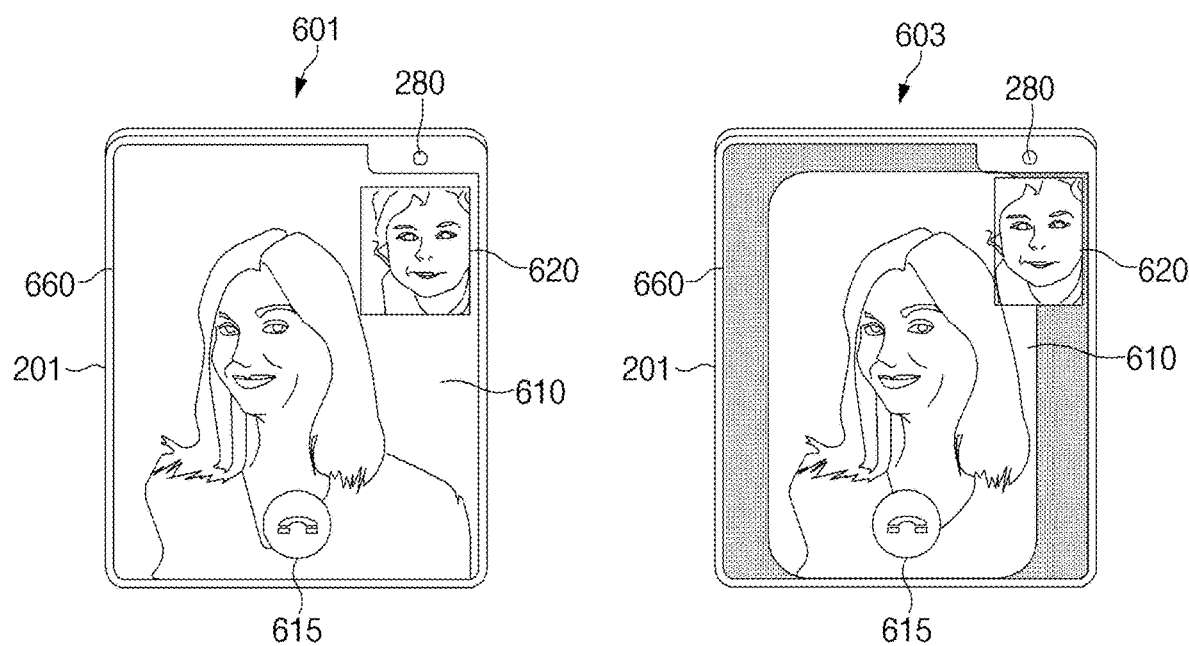
FIG. 6 illustrates display states of an image received by performing a video call according to an example, according to an embodiment of this disclosure.

FIG. 6 illustrates display states of an image received by performing a video call according to an example, according to an embodiment of this disclosure.

In the example of FIG. 6, the electronic device 201 is illustrated as having the shape of the first electronic device 101A of FIG. 3; however, embodiments of the present disclosure are not limited thereto.

With reference to reference number 601 of FIG. 6, for example, the electronic device 201 and the external electronic device 204 may negotiate to perform a video call by using an image having an aspect ratio of 4:3 (e.g., an image having a resolution of 640×480). The electronic device 201 may perform the video call by using the first display 660 and the camera 280 that are used in the unfolded state. In the unfolded state, the first display 660 may have a shape corresponding to an aspect ratio of 4:3. In this case, the electronic device 201 may display the first image 610 received from the external electronic device on the first display 660 with an aspect ratio of 4:3. The electronic device 201 may display the second image 620 acquired using the camera 280 by overlapping it with one region of the first image 610 on the first display 660. In this case, since the negotiated aspect ratio is similar to the aspect ratio of the first display 660, the negotiated aspect ratio may match the current display mode (e.g., display using the first display 660 in the unfolded state).

With reference to reference number 603 of FIG. 6, for example, the electronic device 201 and the external electronic device 204 may negotiate to perform a video call by using an image having an aspect ratio of 16:9 (e.g., an image having a resolution of 1080×720). In this case, the electronic device 201 may display the first image 610 received from the external electronic device on the first display 660 with an aspect ratio of 16:9. In this case, since the negotiated aspect ratio is different from the aspect ratio of the first display 660, the negotiated aspect ratio may not match the current display mode. Due to the difference between the current display mode and the negotiated aspect ratio, the electronic device 201 may display empty spaces (e.g., a black background) on the left and right sides of the first image 610 together.

In order to reduce the display of the black background, it may be considered to stretch the received first image 610. However, if the first image 610 is displayed with the aspect ratio of the first image 610 being maintained and the width thereof being stretched to match the width of the first display 660, a portion of the first image 610 (e.g., an upper portion and a lower portion of the first image 610) may be omitted.

Therefore, if negotiation is conducted using a preset video codec list, the aspect ratio for the negotiated video call may be different from the current display mode of the electronic device 201. The electronic device 201 of the present disclosure may dynamically set a ratio of an image to be used for a video call according to a current display mode of the electronic device 201 when a video call is initiated or while a video call is received. For example, the electronic device 201 may dynamically set the ratio of an image by conducting negotiation or renegotiation with the external electronic device 204 to use the video codec of the aspect ratio matching the current display mode for the video call. Table 1 below may show supported aspect ratios and resolutions for video codecs according to an example.

TABLE 1

| Video codec | Aspect ratio | Width (pixels) | Height (pixels) |
| --- | --- | --- | --- |
| XGA | 4:3 | 1024 | 768 |
| WXGA | 16:9 | 1280 | 720 |
| HD | Up to 16:9 | 1360 | 768 |
| FHD | 16:9 | 1920 | 1080 |
| SXGA | 5:4 | 1280 | 720 |

For example, if the shape of a display used for a current video call or a display to be used for a video call is similar to a square, the electronic device 201 may negotiate a video codec with an extended graphics array (XGA) or super-extended graphics array (SXGA) having an aspect ratio similar to a square. For another example, if the shape of the display used for a current video call or a display to be used for a video call is similar to a rectangle, the electronic device 201 may negotiate a video codec with a wide XGA (WXGA), high definition (HD0, or full HD (FHD) having an aspect ratio similar to a rectangle.

Figure 7:
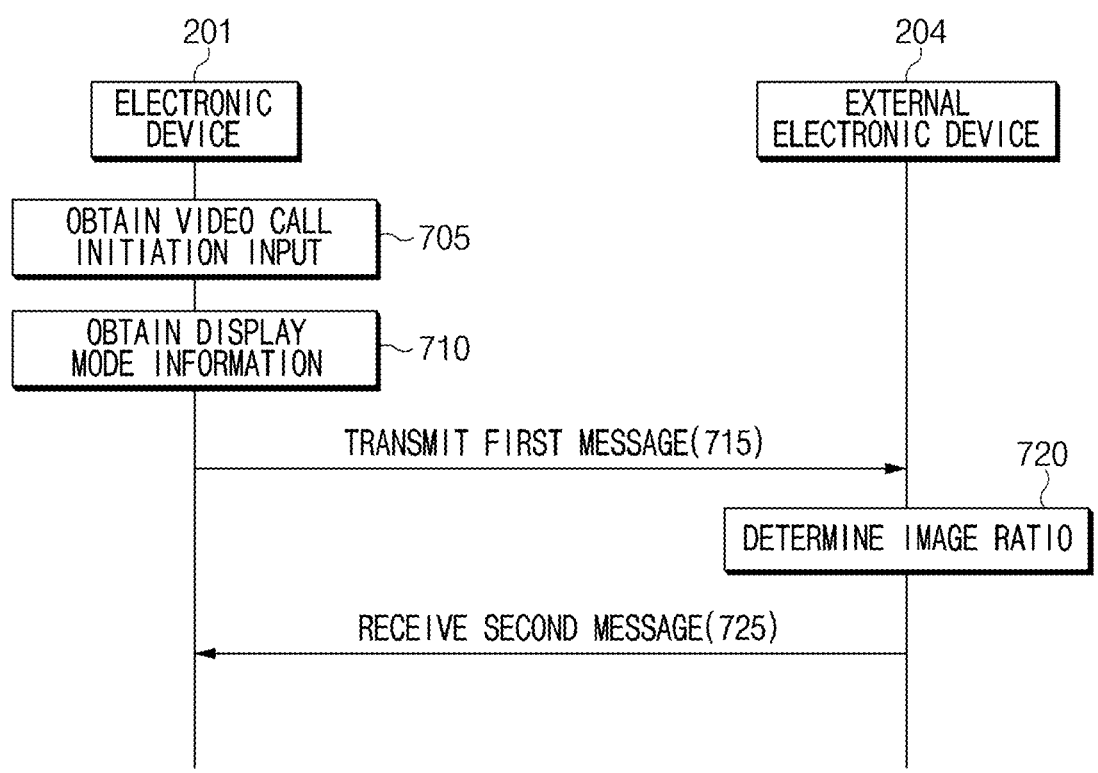
FIG. 7 illustrates a signal flow diagram of a method for originating a video call by an electronic device, according to an embodiment of this disclosure.

FIG. 7 illustrates a signal flow diagram of a method for originating a video call by an electronic device according to an embodiment of this disclosure.

Referring to FIG. 7, in operation 705, the electronic device 201 may obtain an input for initiating a video call. For example, the initiation input of a video call may include any input (e.g., touch input, input to a physical button, input through an accessory device, and/or voice input) to initiate a video call. In operation 710, the electronic device 201 may obtain display mode information of the electronic device 201. For example, the display mode information may include information on an aspect ratio of a display to be used for a current video call of the electronic device 201. The electronic device 201 may determine an image ratio suitable for the video call from the display mode information.

Figure 8:
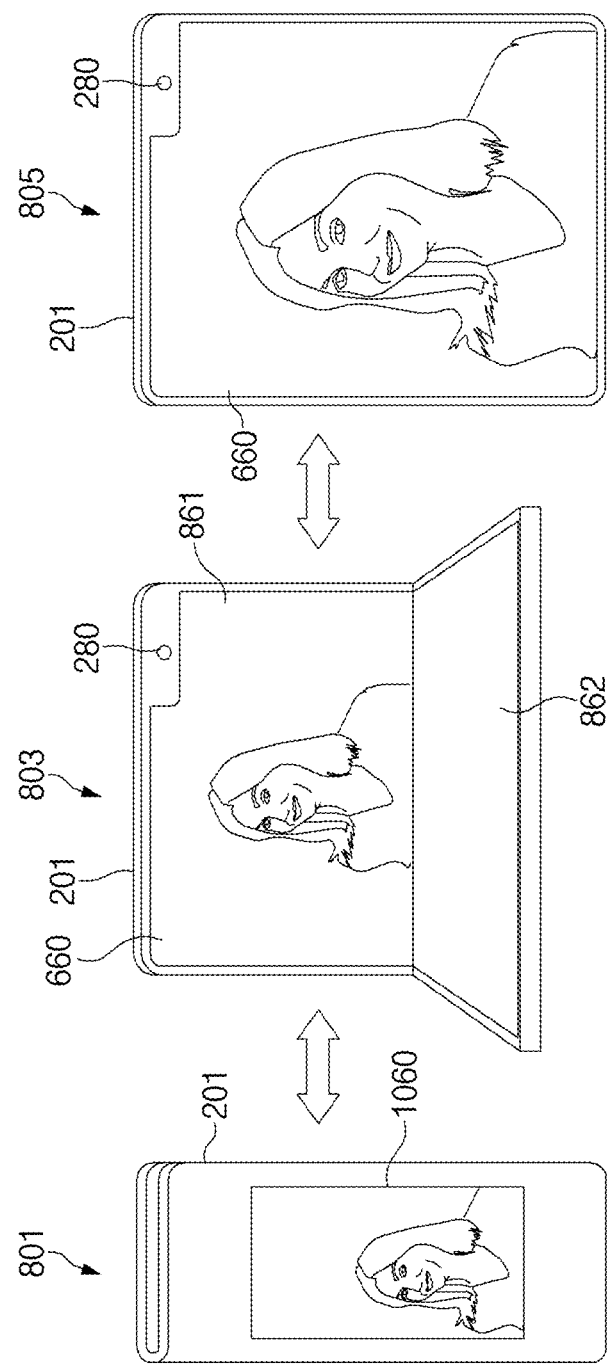
FIG. 8 illustrates display states of an electronic device according to an example, of to an embodiment of this disclosure.

FIG. 8 illustrates display states of an electronic device according to an example, of to an embodiment of this disclosure.

For example, the electronic device 201 may be configured to perform a video call by using the second display 1060 in a folded display mode 801 in the folded state. Since the second display 1060 has an aspect ratio close to 16:9, the electronic device 201 may determine an image ratio suitable for the video call as 16:9 from the display mode information.

For example, the electronic device 201 may be configured to perform the video call in a table display mode 803 in a half-folded state. The first display 660 may include a first display region 861 and a second display region 862 divided around a folding axis. In the table display mode 803, the electronic device 201 may be configured to perform the video call by using the first display region 861 of the first display 660. Since the first display region 861 has an aspect ratio close to 16:9, the electronic device 201 may determine an image ratio suitable for the video call as 16:9 based on the display mode information. For example, if the angle between the first display region 861 and the second display region 862 is within a specified angle range, the electronic device 201 may perform the video call in the table display mode 803.

For example, the electronic device 201 may be configured to perform the video call by using the first display 660 in an unfolded display mode 805 in the unfolded state. Since first display 660 has an aspect ratio close to a square, the electronic device 201 may determine an image ratio suitable for the video call as 4:3 or 5:4 based on the display mode information.

Referring back to FIG. 7, in operation 715, the electronic device 201 may transmit a first message (e.g., a SIP INVITE message) to the external electronic device 204. Hereinafter, unless otherwise described, the description of operation 715 may be referred to by the description of operation 510 of FIG. 5. According to an embodiment, the electronic device 201 may include information on at least one video codec in the first message. For example, in the information on at least one video codec, the video codec may be sorted according to priority. The information on each video codec may include information on an associated video codec and/or information on an associated image ratio.

For example, in the folded display mode 801 or the table display mode 803, the electronic device 201 may set a high priority for an image ratio of 16:9. In the first message, the electronic device 201 may set the 16:9 image ratio to have a higher priority than the image ratio of 4:3 or 5:4. The electronic device 201 may set the priority of the video codec corresponding to the image ratio of 16:9 (e.g., WXGA, HD, and/or FHD) higher than the priority of the video codec corresponding to the image ratio of 5:4 or 4:3 (e.g., XGA or SXGA).

For another example, in the unfolded display mode 805, the electronic device 201 may set a high priority for the image ratio of 4:3 or 5:4. In the first message, the electronic device 201 may set the image ratio of 4:3 or 5:4 to have a higher priority than the image ratio of 16:9. The electronic device 201 may set the priority of the video codec corresponding to the image ratio of 5:4 or 4:3 (e.g., XGA or SXGA) higher than the priority of the video codec corresponding to the image ratio of 5:4 or 16:9 (e.g., WXGA, HD, and/or FHD).

In operation 720, the external electronic device 204 may determine an image ratio. For example, the external electronic device 204 may determine the image ratio by selecting a video codec having the highest priority among video codecs supported by the external electronic device 204 in the video codec list of the received first message. For another example, similar to the electronic device 201, the external electronic device 204 may determine an image ratio based on display mode of the external electronic device 204. The determination of the image ratio by the external electronic device 204 may be referred to by a method for performing a received video call by the electronic device 201, which will be described with reference to FIGS. 11 and 12.

In operation 725, the electronic device 201 may receive a second message (e.g., 200 OK) including information corresponding to the determined image ratio from the external electronic device 204. Unless otherwise described, the description of operation 725 may be referred to by the description of operation 515 of FIG. 5. In FIG. 7, for convenience of description, it may be assumed that the second message indicates an image ratio equal to the image ratio set to have a high priority by the first message. For example, the electronic device 201 may perform a video call in the image ratio indicated by the second message (e.g., operation 525 of FIG. 5).

Figure 9:
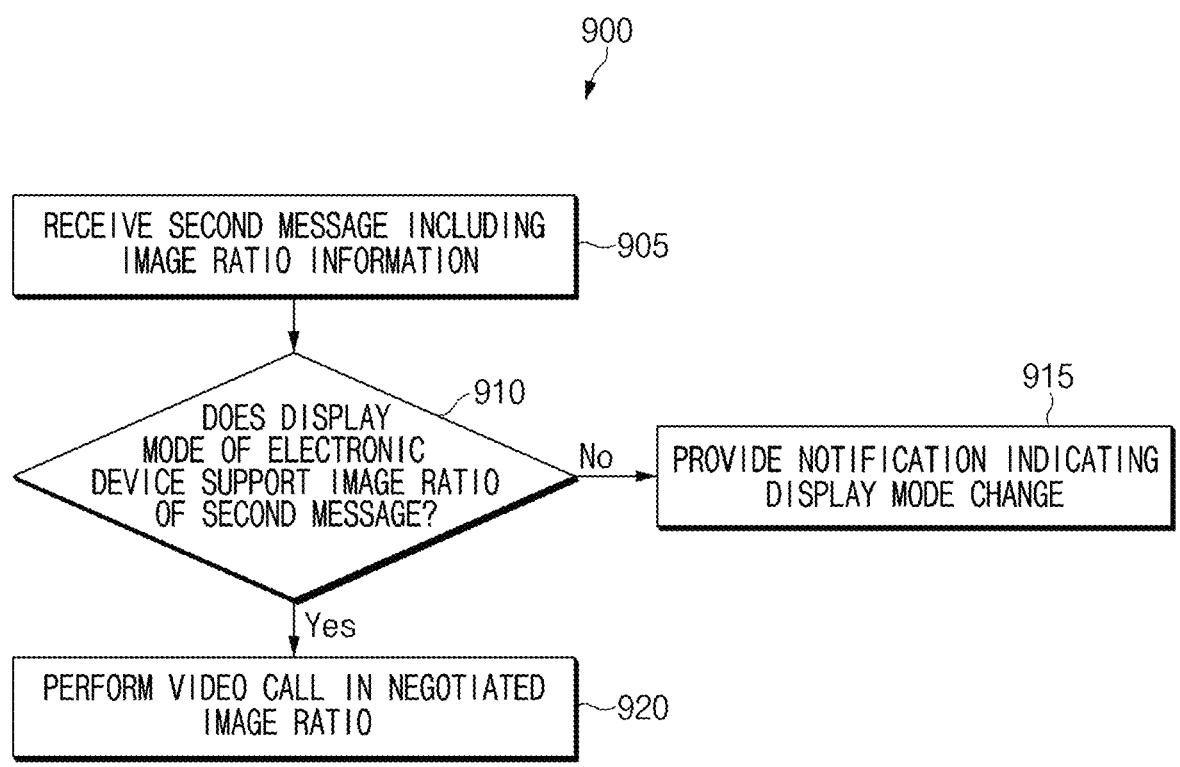
FIG. 9 illustrates a signal flow diagram of a method for performing an originating video call by an electronic device, according to an embodiment of this disclosure.

FIG. 9 illustrates a signal flow diagram of a method for performing an originating video call by an electronic device according to an embodiment of this disclosure.

With respect to FIG. 7, it is assumed that the image ratio indicated by the second message is the same as the image ratio of the high priority of the first message; however, the image ratio of the second message and the image ratio of the high priority of the first message may be different. For example, at least some of the video codecs suggested to the external electronic device 204 by the first message may not be supported by the external electronic device 204.

In operation 905, the electronic device 201 may receive the second message including image ratio information from the external electronic device 204. For example, the electronic device 201 may receive the second message as in operation 725 of FIG. 7. The image ratio information may be indicated by information on video codecs or parameters (e.g., sprop-parameter-sets) in the second message.

In operation 910, the electronic device 201 may determine whether the display mode of the electronic device 201 supports the image ratio indicated by the second message. For example, if the current display mode corresponds to the image ratio indicated by the second message, the electronic device 201 may determine that the image ratio indicated by the second message is supported. If the current display mode does not correspond to the image ratio indicated by the second message, the electronic device 201 may determine that the image ratio indicated by the second message is not supported.

For example, the image ratio indicated by the second message may be 5:4 or 4:3. Referring to FIG. 8, if the display mode of the electronic device 201 is the unfolded display mode 805, the electronic device 201 may determine that the image ratio indicated by the second message is supported. If the display mode of the electronic device 201 is the folded display mode 801 or the table display mode 803, the electronic device 201 may determine that the image ratio indicated by the second message is not supported.

For another example, the image ratio indicated by the second message may be 16:9. Referring to FIG. 8, if the display mode of the electronic device 201 is the unfolded display mode 805, the electronic device 201 may determine that the image ratio indicated by the second message is not supported. If the display mode of the electronic device 201 is the folded display mode 801 or the table display mode 803, the electronic device 201 may determine that the image ratio indicated by the second message is supported.

Referring back to FIG. 9, if the image ratio indicated by the second message is supported (e.g., Yes in operation 910), in operation 920, the electronic device 201 performs the video call in the negotiated image ratio. The electronic device 201 may perform the video call in the image ratio indicated by the second message.

If the image ratio indicated by the second message is not supported (e.g., No in operation 910), in operation 915, the electronic device 201 may provide a notification indicating display mode change. For example, the electronic device 201 may provide a visual, audible, and/or tactile notification for the user to change the display mode. For example, the electronic device 201 may provide a notification such as that illustrated in FIG. 10.

Figure 10:
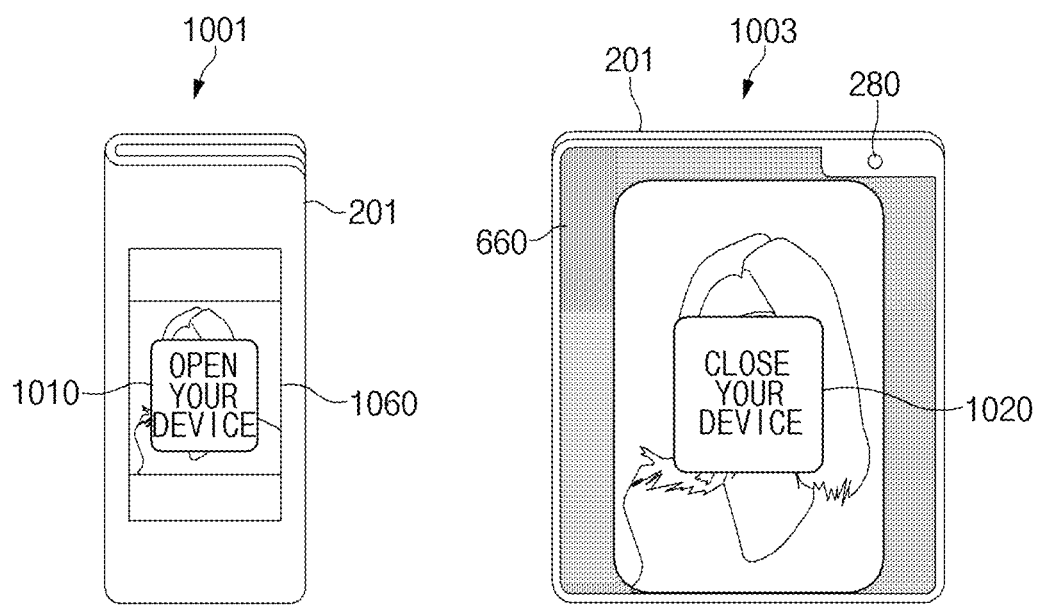
FIG. 10 illustrates providing guide information, according to an embodiment of this disclosure.

FIG. 10 illustrates providing guide information according to an embodiment of this disclosure.

With reference to reference number 1001, the second message indicates the image ratio of 4:3 or 5:4, but the display mode of the electronic device 201 may correspond to the image ratio of 16:9. In this case, the electronic device 201 may provide first guide information 1010 indicating display mode change to the second display 1060. For example, the first guide information 1010 may be information indicating that the display mode is changed by unfolding the electronic device 201.

With reference to reference number 1003, the second message indicates the image ratio of 16:9, but the display mode of the electronic device 201 may correspond to the image ratio of 4:3 or 5:4. In this case, the electronic device 201 may provide second guide information 1020 indicating display mode change to the first display 660. For example, the second guide information 1020 may be information indicating that the display mode is changed by folding the electronic device 201.

If the display mode is changed in response to guide information (e.g., the first guide information 1010 or the second guide information 1020), the electronic device 201 may perform the video call in the image ratio indicated by the second message. For example, if the electronic device 201 is unfolded according to the first guide information 1010, the electronic device 201 may perform the video call in the image ratio indicated by the second message on the first display 660. For another example, if the electronic device 201 is folded according to the second guide information 1020, the electronic device 201 may perform the video call in the image ratio indicated by the second message on the second display 1060.

For another example, the user may not change the display mode according to the guide information, or the user may refuse to change the display mode. In this case, the electronic device 201 may perform the video call in the image ratio indicated by the second message in the current display mode. For another example, the electronic device 201 may attempt renegotiation as in operation 1315 of FIG. 13.

Figure 11:
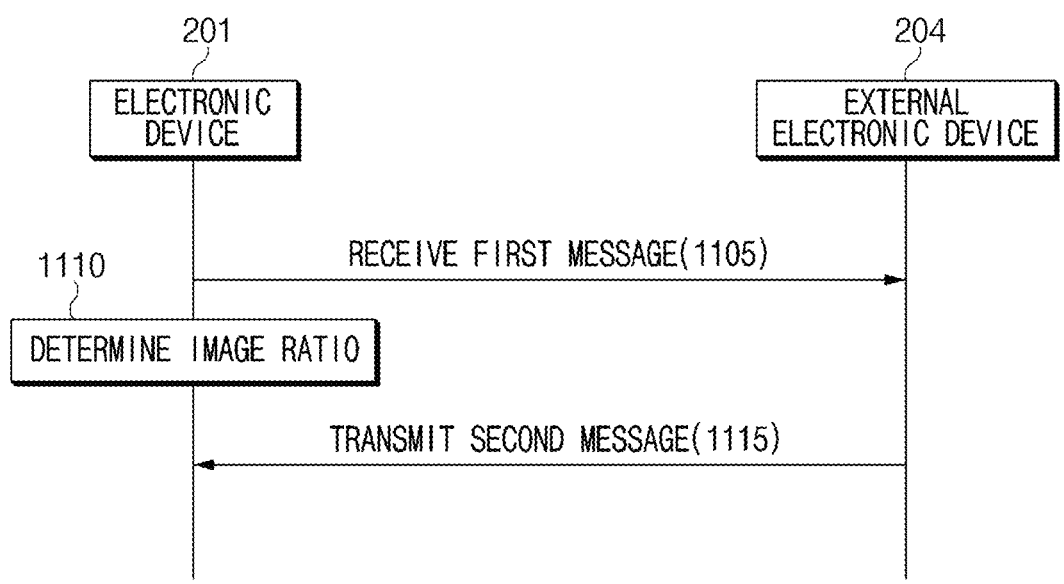
FIG. 11 illustrates a signal flow diagram of a method for receiving a video call by an electronic device, according to an embodiment of this disclosure.

FIG. 11 illustrates a signal flow diagram of a method for receiving a video call by an electronic device according to an embodiment of this disclosure.

In operation 1105, the electronic device 201 may receive a first message from the external electronic device 204. For example, the first message may include information on at least one video codec supported by the external electronic device 204. The information on at least one video codec may be set based on the display mode of the external electronic device 204.

In operation 1110, the electronic device 201 may determine an image ratio. The electronic device 201 may determine an image ratio based on at least one image ratio in the received first message and the display mode of the electronic device 201. For example, the electronic device 201 may determine an image ratio corresponding to the current display mode of the electronic device 201 among the image ratios suggested by the first message as an image ratio to be used for the video call. For example, a method for determining the image ratio of the electronic device 201 may be described later with reference to FIG. 12.

In operation 1115, the electronic device 201 may transmit a second message (e.g., SIP 200 OK) to the external electronic device 204. For example, the second message may include information on the image ratio determined in operation 1110. If a message indicating an ACK is received from the external electronic device 204, the electronic device 201 may perform the video call with the external electronic device 204 in the image ratio indicated by the second message.

Figure 12:
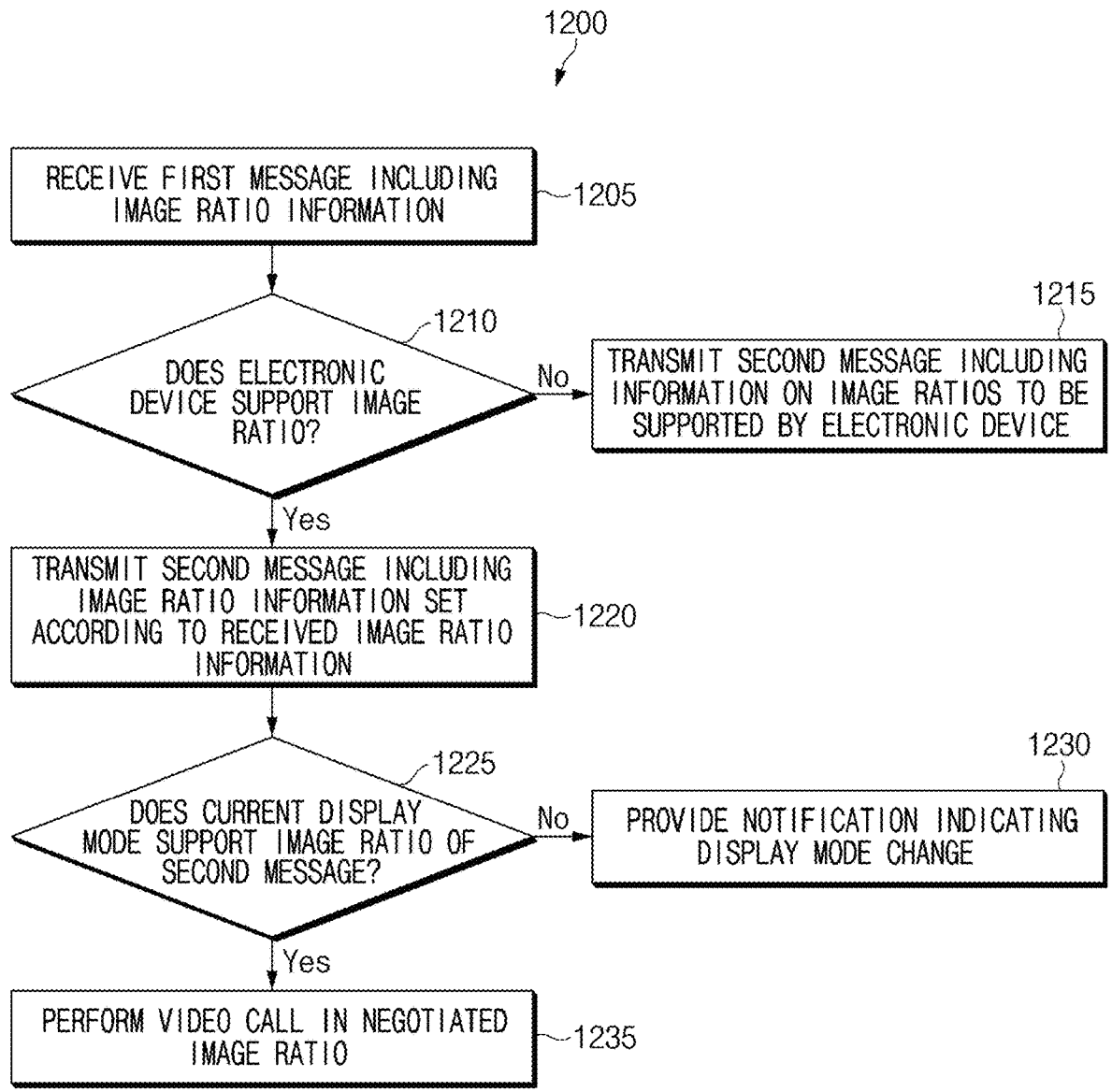
FIG. 12 illustrates a signal flow diagram of a method for performing a received video call by an electronic device, according to an embodiment of this disclosure.

FIG. 12 illustrates a signal flow diagram 1200 of a method for performing a received video call by an electronic device according to an embodiment of this disclosure.

According to an embodiment, when performing a mobile terminate (MT) call, the electronic device 201 may determine an image ratio to be performed for the video call based on the display mode of the electronic device 201.

In operation 1205, the electronic device 201 may receive a first message including image ratio information from the external electronic device 204. For example, the electronic device 201 may receive the first message as in operation 1105 of FIG. 11.

In operation 1210, the electronic device 201 may determine whether the electronic device 201 supports the image ratio indicated by the first message. For example, the electronic device 201 may determine whether to support the corresponding image ratio based on whether the video codec indicated by the first message is supported.

If the electronic device 201 does not support the image ratio indicated by the first message (e.g., No in operation 1210), in operation 1215, the electronic device 201 may transmit, to the external electronic device 204, a second message including information on image ratios to be supported by the electronic device 201. For example, the image ratio indicated by the second message may be different from the image ratio indicated by the first message.

If the electronic device 201 supports the image ratio indicated by the first message (e.g., Yes in operation 1210), in operation 1220, the electronic device 201 may transmit, to the external electronic device 204, a second message including the received image ratio information (e.g., information on the image ratio indicated by the first message and supported by the electronic device 201) set according to the received image ratio information (e.g., the image ratio indicated by the first message). If the electronic device 201 supports one or more of at least one image ratio included in the first message, the electronic device 201 may select an image ratio set to have the highest priority in the first message among the image ratios supported by the electronic device 201, and may transmit a second message indicating the selected image ratio to the external electronic device 204.

In operation 1225, the electronic device 201 may determine whether the current display mode of the electronic device 201 supports the image ratio of the second message. For example, the image ratio of the second message may be 3:4 or 5:4. In this case, referring to FIG. 8, if the display mode of the electronic device 201 is the folded display mode 801 or the table display mode 803, the electronic device 201 may determine that the current display mode does not support the image ratio of the second message. If the display mode of the electronic device 201 is the unfolded display mode 805, the electronic device 201 may determine that the current display mode supports the image ratio of the second message.

If the current display mode does not support the image ratio of the second message (e.g., No in operation 1225), in operation 1230, the electronic device 201 may provide a notification indicating display mode change. For example, the electronic device may provide the first guide information 1010 or the second guide information 1020 of FIG. 10.

If the current display mode supports the image ratio of the second image (e.g., Yes in operation 1225), in operation 1235, the electronic device 201 performs the video call in the negotiated image ratio (e.g., the image ratio indicated by the second message).

Figure 13:
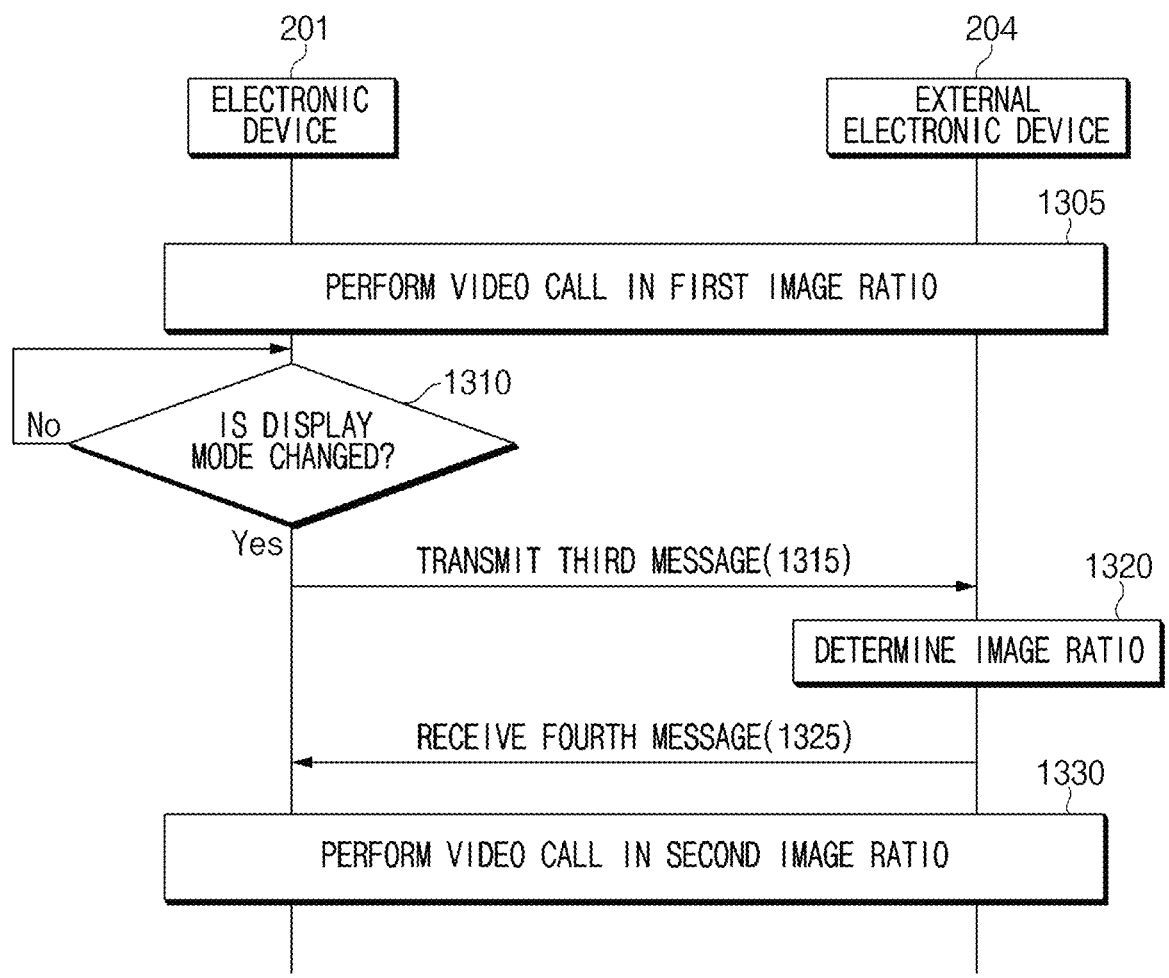
FIG. 13 illustrates a signal flow diagram of a method for renegotiating an image ratio of an electronic device, according to an embodiment of this disclosure.

FIG. 13 illustrates a signal flow diagram of a method for renegotiating an image ratio of an electronic device according to an embodiment of this disclosure.

According to an embodiment, if the display mode is changed while performing a video call, the electronic device 201 may renegotiate an image ratio according to the changed display mode. In the example of FIG. 13, it may be assumed that the electronic device 201 and the external electronic device 204 are performing the video call. The electronic device 201 may be an originating electronic device or a receiving electronic device.

In operation 1305, the electronic device 201 may perform the video call with the external electronic device 204 in a first image ratio. For example, the electronic device 201 may perform the video call in the first image ratio negotiated with the external electronic device 204 according to the method of FIG. 7 or 11.

In operation 1310, the electronic device 201 may determine whether a display mode change is detected while performing the video call. For example, the electronic device 201 may determine whether the display mode is changed by using at least one sensor of the electronic device (e.g., the sensor circuit 270 of FIG. 2). If there is no display mode change (e.g., No in operation 1310), the electronic device 201 may continue to perform the video call in the first image ratio.

If the display mode change is detected (e.g., Yes in operation 1310), the electronic device 201 may perform renegotiation for changing the image ratio associated with the video call. For example, in operation 1315, the electronic device 201 may transmit a third message (e.g., RE-INVITE MESSAGE) to the external electronic device 204. The third message may include image ratio information in which priority is set based on the image ratio corresponding to the changed display mode.

Referring to FIG. 8, for example, the display mode of the electronic device 201 may be changed to the unfolded display mode 805. In this case, the electronic device 201 may set a high priority for the image ratio of 4:3 or 5:4 in the third massage and transmit the third message. For another example, the display mode of the electronic device 201 may be changed to the folded display mode 801 or the table display mode 803. In this case, the electronic device 201 may set a high priority for the image ratio of 16:9 in the third message and transmit the third message.

Referring back to FIG. 13, in operation 1320, the external electronic device 204 may determine an image ratio. For example, the external electronic device 204 may determine the image ratio based on the image ratio indicated by the third message and the display mode of the external electronic device 204. For example, the external electronic device 204 may determine the image ratio in a similar manner to the electronic device 201 of FIG. 12.

In operation 1325, the electronic device 201 may receive a fourth message from the external electronic device 204. For example, the fourth message may include information on the second image ratio determined by the external electronic device 204.

In operation 1330, the electronic device 201 may perform the video call in the second image ratio. For example, the second image ratio may be an image ratio different from the first image ratio. In the example of FIG. 13, the electronic device 201 may dynamically change an image ratio associated with the video call by using the RE-INVITE message in a state of maintaining an existing video call session.

Figure 14:
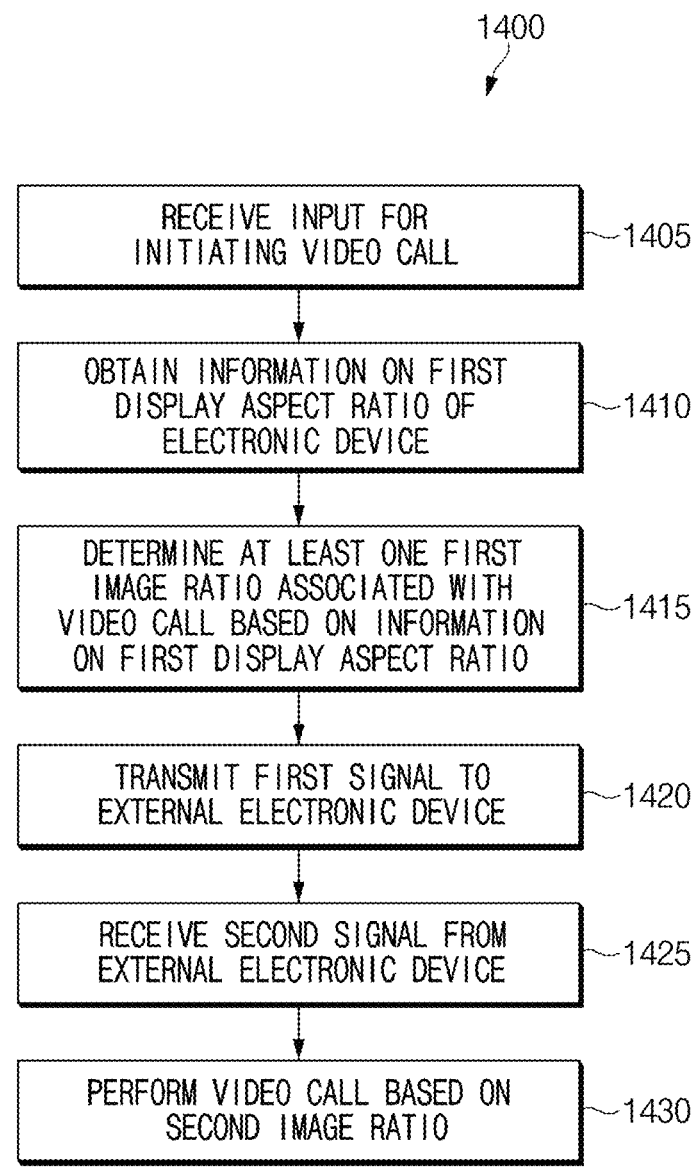
FIG. 14 illustrates a flowchart of a method for performing a video call, according to an embodiment of this disclosure.

FIG. 14 is a flowchart 1400 of a method for performing a video call according to an embodiment of this disclosure.

According to an embodiment, the electronic device (e.g., the electronic device 201 of FIG. 2) may be a foldable electronic device. The electronic device may include at least one display (e.g., the touch display 260 of FIG. 2), a communication circuit (e.g., the communication circuit 290 of FIG. 2), at least one processor (e.g., the processor 220 and/or the communication processor 295 of FIG. 2) operatively connected to the at least one display and the communication circuit, and a memory (the memory 230 of FIG. 2) operatively connected with the at least one processor. The memory may store instructions that, when executed, cause the at least one processor to perform operations to be described below.

In operation 1405, the electronic device may receive an input for initiating a video call. For example, the electronic device may provide an interface for initiating a video call and receive a touch input to the interface as a video call initiation input. For another example, the electronic device may obtain an input for initiating a video call through a voice input or an external electronic device. For example, description of operation 1405 may be referred to by description of operation 705 of FIG. 7.

In operation 1410, the electronic device may obtain information on the first display aspect ratio of the electronic device. The information on the first display aspect ratio may include information on a current state (e.g., display mode) of at least one display of the electronic device. The information on the first display aspect ratio may be information indicating or suggesting the aspect ratio of the display according to the current state of the at least one display. The electronic device may obtain information on a display mode (e.g., information on the first display aspect ratio) by using, for example, a sensor circuit (e.g., the sensor circuit 270 of FIG. 2) of the electronic device. For example, description of operation 1410 may be referred to by description of operation 710 of FIG. 7.

In operation 1415, the electronic device may determine at least one first image ratio associated with the video call based on the information on the first display aspect ratio. For example, the electronic device may determine an image ratio corresponding to the current display mode as the first image ratio.

In operation 1420, the electronic device may transmit a first signal including information on the first image ratio to an external electronic device (e.g., the external electronic device 204 of FIG. 2). For example, the information on the first image ratio may be included in the SIP INVITE MESSAGE. The information on the first image ratio may include video codec information and/or resolution information corresponding to the image ratio. For example, description of operation 1420 may be referred to by description of operation 715 of FIG. 7.

In operation 1425, the electronic device may receive a second signal from the external electronic device. For example, the electronic device may receive a second signal including information on the second image ratio from the external electronic device. For example, the information on the second image ratio may be included in the 200 OK MESSAGE. The information on the second image ratio may include video codec information and/or resolution information corresponding to the image ratio. For example, the information on the second image ratio may include information on at least one video codec supported by the external electronic device 204. For example, the external electronic device 204 may identify a video codec supported by the external electronic device 204 among lots of information on the video codecs included in the first image ratio, and may set information on a video codec having the highest priority among supported video codecs as the information on the second image ratio. For another example, if all information on the video codecs included in the first image ratio is not supported by the external electronic device 204, the external electronic device 204 may set information on a video codec having the highest priority among video codecs supported by the external electronic device 204 as the information on the second image ratio. For example, the description of operation 1425 may be referred to by the description of operation 725 of FIG. 7.

In operation 1430, the electronic device may perform a video call based on the second image ratio. For example, the electronic device may receive video data from an external electronic device by using a communication circuit, and may perform the video call by displaying the video data on at least one display at the second image ratio. For example, when the second image ratio and the first image ratio are the same, the electronic device may output an image corresponding to the video call to the at least one display at the second image ratio. For another example, if the second image ratio and the first image ratio are different, the electronic device may provide guide information (e.g., first guide information 1010 or second guide information 1020 of FIG. 10) indicating folding or unfolding of the electronic device such that the display state of the at least one display corresponds to the second image ratio.

According to an embodiment, the electronic device may further include a sensor circuit configured to detect folding or unfolding of the electronic device. For example, the sensor circuit may include at least one of at least one acceleration sensor, at least one gyro sensor, or at least one hinge sensor. The electronic device may detect the folding or unfolding of the electronic device by using the sensor circuit while performing a video call. If the folding or unfolding is detected while performing a video call of the electronic device, the electronic device may renegotiate an aspect ratio associated with the video call with the external electronic device based on a second display aspect ratio of the at least one display changed with the folding or unfolding. For example, the electronic device may renegotiate the aspect ratio associated with the video call by transmitting, to the external electronic device, a session initiation protocol (SIP) RE-INVITE message including third image ratio information corresponding to the second display aspect ratio. For example, in the at least one display, a display to be used for the video call may be changed or a display region to be used for the video call may be change, with the folding or unfolding of the foldable electronic device.

According to an embodiment, a method for performing a video call by a foldable electronic device may include receiving an input indicating initiation of a video call (e.g., operation 1405), obtaining information on a first display aspect ratio associated with a current state of at least one display of the foldable electronic device (e.g., operation 1410), determining at least one first image ratio associated with the video call based on the information on the first display aspect ratio (e.g., operation 1415), transmitting, to an external electronic device, a first signal including information on the at least one first image ratio (e.g., operation 1420), receiving, from the external electronic device, a second signal including information on a second image ratio associated with the video call (e.g., operation 1425), and performing the video call based on the second image ratio (e.g., operation 1430). The performing of the video call may include receiving video data from the external electronic device, and displaying the video data on the at least one display at the second image ratio. For example, the first signal may include a session initiation protocol (SIP) INVITE message. The information on the at least one first image ratio may include a video codec list including information on a plurality of video codecs supported by the foldable electronic device. A video codec corresponding to the first display aspect ratio may be set to have the highest priority in the video codec list.

The method for performing a video call may further include detecting folding or unfolding of the foldable electronic device during the performing of the video call, and renegotiating an aspect ratio associated with the video call with the external electronic device based on a second display aspect ratio of the at least one display changed with the folding or unfolding of the foldable electronic device, if the folding or unfolding is detected.

The renegotiating of the aspect ratio associated with the video call with the external electronic device may include transmitting, to the external electronic device, a session initiation protocol (SIP) RE-INVITE message including third image ratio information corresponding to the second display aspect ratio.

For example, the detecting of the folding or unfolding of the foldable electronic device may include detecting the folding or unfolding of the foldable electronic device by using at least one of at least one acceleration sensor, at least one gyro sensor, or at least one hinge sensor.

In the at least one display, a display to be used for the video call may be changed or a display region to be used for the video call may be changed, with the folding or unfolding of the foldable electronic device. For example, the performing of the video call based on the second image ratio may include outputting, to the at least one display, an image corresponding to the video call at the second image ratio if the second image ratio is the same as the first image ratio.

The performing of the video call based on the second image ratio may include providing guide information indicating the folding or unfolding of the foldable electronic device if the second image ratio is different from the first image ratio.

What is claimed is:

1. A foldable electronic device comprising:
   a sensor circuit configured to detect folding or unfolding of the foldable electronic device;
   at least one display;
   a communication circuit;
   a memory; and
   at least one processor operatively connected to the at least one display, the communication circuit, and the memory, wherein the at least one processor is configured to:
   obtain information on a first display aspect ratio associated with a current state of the at least one display in response to receiving an input indicating initiation of a video call;
   determine at least one first image ratio associated with the video call based on the information on the first display aspect ratio;
   transmit, to an external electronic device, a first signal including information on the at least one first image ratio by using the communication circuit;
   receive, from the external electronic device, a second signal including information on a second image ratio associated with the video call by using the communication circuit;
   perform the video call by using the communication circuit based on the second image ratio;
   detect the folding or unfolding of the foldable electronic device by using the sensor circuit while performing the video call; and
   renegotiate an image ratio associated with the video call with the external electronic device based on a second display aspect ratio of the at least one display changed with the folding or unfolding of the foldable electronic device.

2. The foldable electronic device of claim 1, wherein the at least one processor is configured to:
   receive, from the external electronic device, video data by using the communication circuit; and
   display the video data on the at least one display at the second image ratio.

3. The foldable electronic device of claim 1, wherein the at least one processor is configured to renegotiate the image ratio associated with the video call by transmitting, to the external electronic device, a session initiation protocol (SIP) RE-INVITE message including a third image ratio corresponding to the second display aspect ratio by using the communication circuit.

4. The foldable electronic device of claim 1, wherein the sensor circuit includes at least one of at least one acceleration sensor, at least one gyro sensor, or at least one hinge sensor.

5. The foldable electronic device of claim 1, wherein the at least one display changes a display to be used for the video call or a display region to be used for the video call with the folding or unfolding of the foldable electronic device.

6. The foldable electronic device of claim 1, wherein the at least one processor is configured to output, to the at least one display, an image corresponding to the video call at the second image ratio when the second image ratio is the same as the first image ratio.

7. The foldable electronic device of claim 1, wherein the at least one processor is configured to provide guide information indicating the folding or unfolding of the foldable electronic device when the second image ratio is different from the first image ratio.

8. The foldable electronic device of claim 1, wherein the first signal includes a session initiation protocol (SIP) INVITE message.

9. The foldable electronic device of claim 8, wherein the information on the at least one first image ratio includes a video codec list including information on a plurality of video codecs supported by the foldable electronic device, and
a video codec corresponding to the first display aspect ratio is set to include a predefined priority in the video codec list.

10. A method for performing a video call by a foldable electronic device, the method comprising:
receiving an input indicating initiation of a video call;
obtaining information on a first display aspect ratio associated with a current state of at least one display of the foldable electronic device;
determining at least one first image ratio associated with the video call based on the information on the first display aspect ratio;
transmitting, to an external electronic device, a first signal including information on the at least one first image ratio;
receiving, from the external electronic device, a second signal including information on a second image ratio associated with the video call;
performing the video call based on the second image ratio;
detecting folding or unfolding of the foldable electronic device during the performing of the video call; and
renegotiating an aspect ratio associated with the video call with the external electronic device based on a second display aspect ratio of the at least one display changed with the folding or unfolding of the foldable electronic device, in response to detecting the folding or unfolding.

11. The method of claim 10, wherein performing of the video call comprises:
receiving video data from the external electronic device; and
displaying the video data on the at least one display at the second image ratio.

12. The method of claim 10, wherein renegotiating of the aspect ratio associated with the video call with the external electronic device comprises transmitting, to the external electronic device, a session initiation protocol (SIP) RE-INVITE message including third image ratio information corresponding to the second display aspect ratio.

13. The method of claim 10, wherein detecting of the folding or unfolding of the foldable electronic device comprises detecting the folding or unfolding of the foldable electronic device by using at least one of at least one acceleration sensor, at least one gyro sensor, or at least one hinge sensor.

14. The method of claim 10, wherein the at least one display changes a display to be used for the video call or a display region to be used for the video call with the folding or unfolding of the foldable electronic device.

15. The method of claim 10, wherein performing of the video call based on the second image ratio comprises outputting, to the at least one display, an image corresponding to the video call at the second image ratio when the second image ratio is the same as the first image ratio.

16. The method of claim 10, wherein performing of the video call based on the second image ratio comprises providing guide information indicating the folding or unfolding of the foldable electronic device when the second image ratio is different from the first image ratio.

17. The method of claim 10, wherein the first signal comprises a session initiation protocol (SIP) INVITE message.

18. The method of claim 10, wherein the information on the at least one first image ratio comprises a video codec list including information on a plurality of video codecs supported by the foldable electronic device, and
a video codec corresponding to the first display aspect ratio is set to include a predefined priority in the video codec list.

* * * * *